US006294207B1

(12) United States Patent
Christiansen et al.

(10) Patent No.: US 6,294,207 B1
(45) Date of Patent: Sep. 25, 2001

(54) CALCIUM FORTIFICATION OF OLEAGINOUS FOODS

(75) Inventors: Earl C. Christiansen, South Ogden; Stephen D. Ashmead, Clinton; Clayton Ericson, Ogden, all of UT (US)

(73) Assignee: Albion International, Inc., Clearfield, UT (US)

( * ) Notice: Subject to any disclaimer, the term of this patent is extended or adjusted under 35 U.S.C. 154(b) by 0 days.

(21) Appl. No.: 09/431,387

(22) Filed: Nov. 1, 1999

(51) Int. Cl.[7] .............................. A23D 7/00; A23D 9/00; A23C 15/00
(52) U.S. Cl. ....................... 426/74; 426/601; 426/603; 426/663; 426/664; 426/608; 562/553
(58) Field of Search ..................................... 562/562, 563, 562/573, 576, 447, 553; 426/74, 601, 603, 608, 663, 664

(56) References Cited

U.S. PATENT DOCUMENTS

| | | | |
|---|---|---|---|
| 3,928,506 | * 12/1975 | Gobert | 260/924 |
| 4,156,021 | 5/1979 | Richardson . | |
| 4,446,165 | 5/1984 | Roberts . | |
| 4,533,561 | 8/1985 | Ward . | |
| 4,599,152 | 7/1986 | Ashmead . | |
| 4,830,716 | 5/1989 | Ashmead . | |
| 4,863,898 | 9/1989 | Ashmead et al. . | |
| 5,186,965 | * 2/1993 | Fox | 426/74 |
| 5,194,270 | * 3/1993 | Cante | 426/74 |
| 5,215,769 | 6/1993 | Fox et al. . | |
| 5,219,602 | * 6/1993 | Saleeb | 426/250 |
| 5,258,190 | * 11/1993 | Cante | 426/74 |
| 5,516,925 | 5/1996 | Pedersen et al. . | |
| 5,744,178 | * 4/1998 | Ikeda | 426/2 |
| 5,928,691 | * 7/1999 | Reddy | 426/74 |
| 6,022,581 | * 2/2000 | Ikeda | 426/656 |
| 6,063,411 | * 5/2000 | Jacobson | 426/74 |

FOREIGN PATENT DOCUMENTS

| | | | |
|---|---|---|---|
| 2299992 | * | 4/1995 | (GB) . |
| WO 98/14173 | * | 4/1998 | (WO) . |
| WO 98/18349 | * | 5/1998 | (WO) . |
| WO 98/32343 | * | 7/1998 | (WO) . |

OTHER PUBLICATIONS

Stecher 1968 The Merck Index Merck & Co. Inc Rahway NJ pp. 639–640.*

* cited by examiner

Primary Examiner—Carolyn Paden
(74) Attorney, Agent, or Firm—Thorpe North & Western

(57) ABSTRACT

A calcium amino acid malic acid chelate complex for fortification of oleagnious foods which is stable, bioavailable, and palatable is disclosed. Further, oleaginous foods fortified with the calcium amino acid malic acid chelate complexes of the present invention are also disclosed. The calcium amino acid malic acid chelate complex is prepared by reacting a calcium source, an amino acid ligand, and malic acid in an aqueous environment.

10 Claims, No Drawings

CALCIUM FORTIFICATION OF OLEAGINOUS FOODS

FIELD OF THE INVENTION

This invention is directed to a composition for calcium fortification of oleaginous or highly lipid foods such as margarine, butter, lards, vegetable oil spreads, and vegetable oils. Particularly, this invention relates to 1) calcium amino acid malic acid chelate complexes and 2) calcium amino acid malic acid chelate complex fortified oleaginous foods that are stable, palatable and have a high calcium content.

BACKGROUND OF THE INVENTION

It has been widely accepted that calcium is an essential element for formation of bone and teeth in animals, including humans. In fact, though calcium is the most abundant mineral in the body, approximately 99% of the body's calcium is found in the bones and teeth providing an exchangeable pool of calcium. The remaining one percent is widely distributed in cells and body fluids and is responsible for the regulation of a number of metabolic functions such as nerve impulse conduction, muscle fiber contraction, hormone secretion, blood coagulation, normal heart beat, activation of enzymes, and maintenance of cell membranes. Additionally, calcium is receiving much attention on the front line of medical science because it has recently been discovered that calcium is one of the most important elements for supporting many life activities. For example, recent observations indicate that calcium deficiency not only induces osteoporosis, but also contributes to such diseases as hypertension, arteriosclerosis, arthritis, diabetes, immunological diseases, colon cancer, and obesity. Therefore, the presence of sufficient amounts of calcium within the body is essential for proper health.

One of the problems associated with calcium supplementation is that all sources of calcium are not equally soluble or bioavailable. In addition, some calcium sources are not as pure as others. For example, calcium carbonate derived from bone meal, oyster shell, or other biological origin contains trace amounts of lead and other minerals. Some calcium carbonates also contain silica. Therefore, it is necessary to take additional amounts of these materials to achieve the same bioavailable calcium level as those taken from synthetic sources of essentially pure calcium. In fact, foods fortified with calcium and calcium supplements are being used more often by U.S. consumers and are generally considered by some researchers to offer the same net effect as calcium found naturally in food.

The most effective order of relative bioavailability or intestinal absorption of various calcium salts is controversial. Nevertheless, there are several known factors that affect the absorption of calcium by the human body. In healthy adults, approximately 30% of calcium contained in their diets is absorbed. However, the absorption of calcium from various foods may range from 10% to 40%. Generally, at higher intakes, the efficiency of the absorption process decreases. This is probably due to the body's ability to control the absorption process based upon the need or lack of need for calcium. However, there are methods of altering the body's control over calcium uptake. For example, vitamin D is known to accelerate the intestinal absorption of calcium.

Many forms of ingested calcium are water insoluble and require specific enzymes for proper digestion. These enzymes extract calcium from food and transport it into the blood stream. However, these transport enzymes are not 100% efficient. This means that the transfer of calcium into the blood stream is an amount that is less than the total ingested inorganic calcium. Additionally, acid solutions enhance the solubility of calcium salts. Indeed, the calcium salts in common vitamins are more soluble under acidic conditions. Much of the digestion of foods takes place in the duodenum where the pH of the gastric juices is low. Since calcium salts are more soluble in an acid pH, much of the absorption takes place in this segment of the gastrointestinal tract.

As stated above, calcium is one of the essential minerals involved in many significant biological processes. Recent medical studies have indicated that a diet containing the U.S. recommended daily allowance (RDA) of calcium may be effective in preventing osteoporosis and possibly, preventing high blood pressure and colon cancer. At the same time, oleaginous or high lipid foods such as margarine, butter, lards, vegetable oil spreads, and plant oil are also a significant part of our daily diet. Therefore, there is great public interest in the consumption of calcium fortified oleaginous foods which contain a relatively high percentage of stable, palatable, and bioavailable calcium.

It has been discovered that the biological transport of metal ions can be significantly enhanced by the use of an amino acid chelate because amino acid chelates are absorbed intact by the mucosal cells (see U.S. Pat. No. 4,863,898). This invention demonstrates that a calcium amino acid chelate has enhanced bioavailability as compared to non-chelated calcium due to the active transport of calcium chelates (CaAAC) out of the digestive tract and into the blood stream.

In the area of animal nutrition, the American Association of Feed Control Officials has issued an official definition for an amino acid chelate which defines an amino acid chelate as, "a metal ion from a soluble salt with amino acids with a mole ratio of one mole of metal to one to three (preferably two) moles of amino acids to form coordinate covalent bonds. The average weight of the hydrolyzed amino acids must be approximately 150 and the resulting molecular weight of chelate must not exceed 800."

Additionally, it is documented that amino acid chelates can be prepared from metal ions which do not come from soluble salts. Ashmead, in U.S. Pat. Nos. 4,599,152 and 4,830,716 discloses methods of preparing pure amino acid chelates using metal sources other than soluble metal salts. In addition, Ashmead also discloses in U.S. Pat. No. 5,516,925, methods of preparing amino acid chelates having improved palatability.

Oleaginous or highly lipid foods such as margarine, butter, lards, vegetable oil spreads, and vegetable oils are a significant part of the human diet. Thus, it would be desirable to provide calcium fortified oleaginous or highly lipid foods, yet maintain the desired palatability and storage stability. However, serious practical difficulties in incorporating calcium salts into oleaginous or highly lipid foods have been encountered because most calcium salts have very low solubility in an oleaginous environment. In addition, with regard to the low bioavailability of calcium salt, it is also known that calcium ions form insoluble salts or soaps with long chain fatty acids resulting from metabolism of fat in the gut. Therefore, there is a great need to provide calcium fortification for oleaginous so that the oleaginous foods remain not only palatable and stable, but that the calcium fortificant remains capable of substantially avoiding the formation of insoluble salts.

OBJECTS AND SUMMARY OF THE INVENTION

It is therefore an object of the invention to provide a calcium amino acid malic acid chelate complex for calcium fortification of oleaginous or highly lipid foods that is bioavailable, stable, and palatable.

Another object of the present invention is to provide calcium fortified oleaginous food products that substantially maintain their organoleptic properties, i.e., texture, smell, taste, color, etc.

These and other objects may be accomplished by preparing oleaginous or highly lipid foods emulsified with a calcium amino acid malic acid chelate complex. The calcium amino acid malic acid chelate complexes are prepared by reacting calcium, an amino acid, and malic acid in water. The product produced has an amino acid to calcium content molar ratio from about 1:2 to 1:1. Further, malic acid is complexed to the calcium amino acid product at a malic acid to calcium content molar ratio from about 1:2 to 2:1. It is believed that the malic acid may complex directly with the calcium and/or form a complex with the calcium amino acid chelate.

DETAILED DESCRIPTION OF THE INVENTION

Before the present invention is disclosed and described, it is to be understood that this invention is not limited to the particular process steps and materials disclosed herein as such process steps and materials may vary somewhat. It is also to be understood that the terminology used herein is used for the purpose of describing particular embodiments only and is not intended to be limiting since the scope of the present invention will be limited only by the appended claims and equivalents thereof.

It must be noted that, as used in this specification and the appended claims, singular forms of "a," "an," and "the" include plural referents unless the content clearly dictates otherwise.

As used herein, the terms "palatable" and "improved palatability" mean that compositions for calcium fortification of oleaginous or highly lipid foods of this invention are substantially lacking the metallic aftertaste or disagreeable flavor of prior art calcium fortified products to the extent that they have a more pleasant taste to the consuming warm-blooded host, i.e., an animal or human being. This is not to say that these calcium fortified oleaginous or highly lipid foods are completely lacking flavor or taste.

"Bioavailable" means, for purposes of this invention, that the calcium source is available to the body.

"Amino acid chelate" means, for purposes of this invention, that the amino acid forms a heterocyclic ring with the metal as the closing member. Typically, a coordinate covalent bonds exist between the metal ion and the ligand at the α-amino group. However, either ionic bonds, covalent bonds, and/or coordinate covalent bonds may exist between the carboxyl oxygen group and the metal ion.

"Calcium amino acid chelate complex" or "calcium amino acid malic acid chelate complex" means that as the pH level of the calcium amino acid chelate is lowered, the reaction between the α-amino group and the calcium remains covalent, but the reaction between the carboxyl oxygen and the calcium center becomes more ionic and less covalent. Further, malic acid, which acts in part as a pH adjuster, is preferably also complexed to the calcium amino acid chelate complex.

"Stable" means that the fortificant of the present invention will not significantly alter the shelf-life of the oleaginous or highly lipid foods to which the amino acid chelate complex is added.

"Compatible" refers to the fact that the oleaginous or highly lipid foods fortified with the amino acid chelate complexes of the present invention do not significantly affect the organoleptic properties, i.e., sensory properties of the underlying oleaginous food product. For example, taste, texture and smell of the underlying oleaginous or highly lipid foods are not significantly altered in the presence of the amino acid chelate complexes of the present invention.

"Oleaginous food" or "highly lipid food" refers to food products containing a majority of oil or fat such as, but not limited to, margarine, butter, lards, vegetable oil spreads, and all kinds of edible plant oil and oil dressings.

Without undue limitation, this disclosure is directed to stable, bioavailable and palatable calcium fortified oleaginous foods. Additionally, a composition and method of preparing a calcium amino acid malic acid chelate complex used for said fortification is also disclosed herein.

The calcium amino acid malic acid chelate complexes are prepared by reacting calcium, an amino acid, and malic acid in water. The product produced has an amino acid to calcium content molar ratio from about 1:2 to 1:1. Further, malic acid is complexed to the calcium amino acid product at a malic acid to calcium molar ratio from about 2:1 to 1:2.

Malic acid, which is an α-hydroxy acid, is often used as a buffering agent or a chelating agent and may be represented by Formula 1 below:

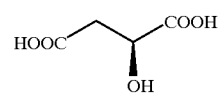

Formula 1

One possible mechanism by which the malic acid may chelate or complex with the amino acid chelate complexes is by bonding with the calcium ion or calcium chelate complex at the α-hydroxy group and/or at one of the carboxyl oxygen groups. In such an instance, either a six membered ring or, preferably, a five membered ring may be formed. However, this is merely one proposed mechanism of attachment. It is notable that the malic acid may complex directly with the calcium and/or with the calcium amino acid chelate as long as the calcium amino acid chelate complex is comprised of calcium, an amino acid and malic acid in the prescribed ratios.

The calcium source is preferably calcium oxide. However, other calcium compounds may be used such as calcium hydroxide, calcium carbonate and calcium chloride. Further, though glycine is a preferred amino acid ligand, the amino acid ligand may be selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine, and dipeptides, tripeptides, and tetrapeptides formed by any combination of said amino acids thereof.

A specific preferred embodiment of the composition of the present invention is prepared by reacting calcium oxide, malic acid, and glycine. In such a combination, it is preferred that the amino acid ligand to calcium molar ratio is from about 0.85:1 to 1:1. Further, it is also preferred that the malic acid to calcium molar ratio is from about 1:0.7 to 1:1.

The calcium amino acid malic acid chelate complex may be added to the emulsion process of an oleaginous food product such as margarine, butter, lards and all kinds of edible plant oils, vegetable oil spreads, and oil dressings. Depending upon the oleaginous food product, optionally, an emulsifier selected from the group consisting of carrageenans, gum arabic, and guar gum may be used. Further, a stabilizer selected from the group consisting of monoglyceride, diglyceride, lecithin, sodium stearyl lactate, citric acid ester of monoglyceride, and combinations thereof may also be added to certain oleaginous foods.

EXAMPLES

The following examples illustrate the compositions of the present invention. These examples should not be considered as limitations of the present invention. These examples merely teach how to make the best known calcium amino acid malic acid chelate complexes for fortification of dairy products and oleaginous foods based upon current data.

EXAMPLE 1

About 249 parts by weight of calcium oxide was added to 1980 parts by weight of deionized water. The mixture was heated to 140° F. and blended for 15 minutes. To this solution was added 228 parts by weight of glycine which was then blended for 60 minutes while maintaining a temperature of 150° F. Next, 518 parts by weight of malic acid was slowly added to the solution and was blended for 15 minutes. The heated solution was filtered and spray dried to produce a calcium glycine malic chelate complex having a content of 17.8% calcium by weight. The glycine to calcium molar ratio was about 0.96:1. Further, the malic acid to calcium molar ratio was about 1:0.81. When reconstituted in water, the solution had a pH of about 9.

EXAMPLE 2

Calcium fortified margarine was prepared by the following process. A mixture of the fat phase consisting of partially hydrogenated soybean oil (21.0% by weight), liquid soybean oil (56.5% by weight), lecithin (Actiflo 68UB) (0.20% by weight), emulsifier (Dimodan PVP) (0.20% by weight) and beta carotene (color and vitamin A) (0.004% by weight) was heated to 50° C. A mixture of the water phase consisting of water (15.4% by weight), salt (1.20% by weight), non-fat dry milk (1.00% by weight), calcium amino acid chelate prepared as described in Example 1 (4.32% by weight), potassium sorbate (0.10% by weight), citric acid (0.05% by weight) and natural or artificial butter flavor (0.02% by weight) was heated to 50° C. To prepare the emulsion, the water phase was added to the fat phase with high sheer and the emulsion was run through the scrape surface heat exchanger. The product of the emulsion was then packaged and tempered at 5° C. for 24–48 hours. This 80% soft margarine was fortified at a rate of 200 mg calcium per ounce with the calcium amino acid chelate prepared as described in Example 1. The calcium fortified margarine prepared as described above was palatable and was stable at refrigerated temperature for up to four months.

While the invention has been described with reference to certain preferred embodiments, those skilled in the art will appreciate that various modifications, changes, omissions and substitutions can be made without departing from the spirit of the invention. It is intended, therefore, that the invention be limited only by the scope of the following claims.

We claim:

1. A calcium fortified oleaginous food product fortified with from 2 to 8% by weight of a calcium amino acid malic acid chelate complex comprised of (a) an oleaginous food selected from the group consisting of margarine, butter, lard, vegetable oil spread, and oil; and (b) a calcium amino acid malic acid chelate complex prepared by reacting a calcium source, an amino acid ligand, and malic acid in an aqueous environment wherein the amino acid ligand to calcium molar ratio is from about 1:2 to 1:1 and the malic acid to calcium molar ratio from about 2:1 to 1:2.

2. A calcium fortified food product as in claim 1 wherein said calcium source is selected from the group consisting of calcium oxide, calcium hydroxide, calcium carbonate, calcium chloride, and combinations thereof.

3. A calcium fortified food product as in claim 2 wherein said calcium source is calcium oxide.

4. A calcium fortified food product as in claim 1 wherein said amino acid ligand is selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine, and dipeptides, tripeptides and tetrapeptides formed by any combination of said amino acids thereof.

5. A calcium fortified food product as in claim 4 wherein said amino acid ligand is glycine.

6. A calcium fortified food product as in claim 1 wherein said amino acid ligand to calcium molar ratio is from about 0.85:1 to 1:1.

7. A calcium fortified food product as in claim 6 wherein said malic acid to calcium molar ratio is from about 1:0.7 to 1:1.

8. A calcium fortified food product as in claim 7 wherein said calcium source is calcium oxide and said amino acid ligand is glycine, and wherein said amino acid ligand to calcium molar ratio is from about 0.85:1 to 1:1 and said malic acid to calcium molar ratio is from about 1:0.7 to 1:1.

9. A calcium fortified oleaginous food product as in claim 1 which further comprises an effective amount of emulsifier selected from the group consisting of carrageenans, gum arabic, and guar gum.

10. A calcium fortified oleaginous food product as in claim 1 wherein an effective amount of stabilizer selected from the group consisting of monoglyceride, diglyceride, lecithin, sodium stearyl lactate, citric acid ester of monoglyceride, and combinations thereof is added.

\* \* \* \* \*